Dec. 15, 1970  D. C. ANDERSON  3,547,727
METHOD OF HEAT CURING AND PRESSING BLOCKS OF HONEYCOMB
Filed July 21, 1967
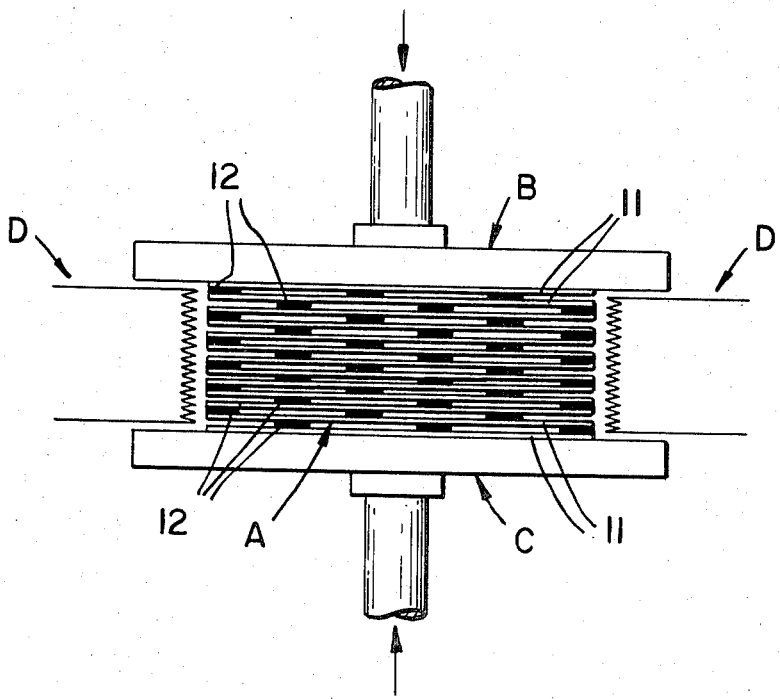
INVENTOR.
DONALD C. ANDERSON
BY
Townsend and Townsend
ATTORNEYS 3,547,727
METHOD OF HEAT CURING AND PRESSING
BLOCKS OF HONEYCOMB
Donald C. Anderson, Lafayette, Calif., assignor to Hexcel
Corporation, Dublin, Calif.
Filed July 21, 1967, Ser. No. 655,099
Int. Cl. B32b 7/14
U.S. Cl. 156—291                                     1 Claim

ABSTRACT OF THE DISCLOSURE

A method of pressing and curing blocks of adhesive bonded metal honeycomb consisting of superposed sheets of metal foil to which have been applied partially cured adhesive node lines. The stack is placed under compression and heat is applied from sources located at opposite sides of the stack to cause heat transfer to the interior of the stack primarily by conduction through the sheets in the planes of the sheets.

---

This invention relates to the art of manufacturing metal foil honeycomb and more particularly relates to an improved method for pressing and heat curing blocks or stacks of metal foil honeycomb materials.

The present invention comprises generally the steps of providing a stack of superposed layers of metal foil to which have been applied partially cured organic bonding lines and which characteristically are applied in parallel spaced relation and oriented so that the node lines between alternate layers of the stack are staggered relative to one another.

The stack is placed in a press which exerts a static compressional load thereon in a direction normal to the plane of the metal foil sheets while concurrently heat (to enhance curing of the adhesive) is applied from at least two opposite sides of the stack to cause transfer of heat interiorly thereof primarily by conduction of heat through the metal foil sheets in the direction of the planes in which they lie.

In the manufacture of metal foil honeycomb by the expansion process, it is the common practice of the industry today to press and heat-cure relatively large blocks of the material from which slices of desired thickness can be sawed and subsequently expanded. The blocks of honeycomb initially consist of a stack of metal foil sheets to which have been applied adhesive node lines of a thermosetting type and which at the time the sheets are stacked have been advanced to a substantially dry partially curved B stage. In order to cause the node lines of the sheets to bond the stacks are put into heated presses whereat heat and pressure are simultaneously applied. Typically the heat sources are incorporated in the platens of the press whereby heat is transferred interiorly of the stack primarily by conduction through the stack in a direction normal to the flat planes of the sheets. Application of heat and pressure initially causes the adhesive lines to flow into contact with adjacent metal surfaces, and upon continued application of heat and pressure the curing cycle is completed so that the adhesive lines become relatively infusible and hard set.

In employing the conventional practices of heat curing and pressing above described it is necessary to apply heat and pressure over fairly sustained and prolonged periods of time in order to obtain a complete and uniform transfer of heat from the platens to the central interior of the stack of sheets. Depending on various variable factors such as the thickness of the stack, the gauge of the metal foil, the type of adhesive employed, etc. a normal heat-press curing cycle may vary from one to three hours in duration. It is obvious that the duration of the cycle involves economic factors including the length of time that a press must be kept in use to cure one block, and the amount of energy used to generate heat over a given period of time. From the economic standpoint alone it is therefore desirable to reduce the duration of the curing cycle.

Depending on the chemistry involved in reference to particular types of adhesive, it has been found that with certain adhesives having a relatively short heat curing cycle it is not practical to overexpose a stack or any part thereof to prolonged periods of heat application. In this connection certain adhesives will undergo adverse chemical or physical changes if subjected to continuous heat over the prolonged periods of time normally required in conventional practice as above indicated. It is therefore desirable, if not essential, in such instances to provide for a more rapid transfer of heat from the exterior surfaces to the interior portions of the stack so that no part of the stack will be subject to over-extended periods of heat application.

The principal object of the present invention is to teach a method of applying heat to a honeycomb stack in such manner that the heat will be transferred more rapidly to the interior of the stack than can be accomplished using conventional press curing equipment and methods as above described. In this connection, when according to prior art practices, heat is transferred from the platens of a press to the stack the heat transfers primarily by conduction through the metal foil sheets in a direction normal to the planes of the sheets within the stack. In such arrangement there inherently exists a heat transfer barrier between each interface of adjacent layers by virtue of the presence of the organic adhesive lines which act as poor thermal conductors plus the air gap or space that exists between the layers where the adhesive lines do not exist. As a consequence the rate of heat transfer through the stack in a direction normal to the planes of the sheets is much slower than the rate of transfer would be through a solid block of metal of the same type and alloy as the metal sheets themselves.

I have found that the rate of heat transfer can be surprisingly increased by applying the heat to the stack from sources located at opposite sides or ends (herewith interchangeably referred to as "sides") of the stack and whereby heat is transferred to the interior of the stack primarily by heat conduction through the planes of the metal sheets themselves. In such an arrangement each sheet is its own heat conductor and to obtain heat transfer to the interior portions of the stack it is not necessary for the heat to travel through the many heat barriers comprising the adhesive lines and air gaps which exist between the interfaces of the foil sections.

The accompanying drawing is a substantially diagrammatic view in end elevation of a stack of honeycomb positioned between the platens of a conventional press and further showing application of heat to the sides of the stack by sources located adjacent thereto. The thickness of the adhesive lines in the stack is exaggerated for purpose of convenient illustration.

More specifically, the drawings illustrate a stack of metal foil honeycomb A positioned between upper and lower platens B and C of a conventional hydraulic press and in conjunction with which are placed electric radiant heaters D in close adjacency or contact with opposite sides of the stack A.

The honeycomb stack heretofore indicated generally at A typically comprises a large number of metal foil sheets (such as aluminum alloy sheets) to which have been applied partially cured organic adhesive node lines 12 and in such arrangement that the node lines between adjacent sheets are oriented in alternately staggered relationship with respect to one another. As is common in conventional practice, it may be assumed that the adhesive lines have been applied in the form of stripes to the metal sheets by some suitable printing equipment and that prior to arranging the sheets in the stack the lines have been partially cured to a substantially dry, nontacky B stage condition whereby upon application of subsequent heat and pressure the adhesive lines will soften and flow into contact with adjacent metal surfaces and then, upon continued application of heat, advance to a final relatively infusible thermoset C stage.

The heat sources D may be of any suitable type that will efficiently radiate heat that will be transferred by conduction through the metal foil sheets to the interior portions thereof. In the drawing the heaters are diagrammatically illustrated as comprising electric resistance heaters which would normally be mounted on a reflective surface to generate radiant heat directed toward the sides of the metal honeycomb stack.

It is appreciated that the temperature and duration of heat applied in any given instance will depend on various factors already known or readily determinable within the skill of the art. In this connection it will either be known or determinable the appropriate curing temperatures and cycles for each type of adhesive-employed. Further the temperature and duration of heat to be applied will depend upon the known or determinable thermal conductivity of the particular type of metal foil sheets being processed as well as the distances that the heat must be transferred to the interior of the stack. Likewise the amount of pressure to be applied to a given stack of honeycomb to secure an intimate adhesive bond and the duration over which such pressures should be applied, are known or readily determinable within the skill of the art.

As a general proposition it has been found that the heat-pressure curing cycle of a honeycomb stack in accordance with the practices of the present invention will or can be effected in substantially less amount of time than would take utilizing the conventional practices where the heat to the stack is applied through the platens of the press and in a direction normal to the planes of the sheets within the stack. It is also contemplated that the present invention may be utilized as a supplement to, rather than complete substitution for, the more conventional practices of using heated platens.

Although the present invention has been described in some detail by way of illustration and example, it is understood that certain changes and variations may be made within the spirit of the invention as limited only by the scope of the claim appended hereto.

I claim:
1. In the art of pressing and curing adhesive bonded honeycomb of the type comprising a stack of superposed sections of metal foil to which partially cured organic adhesive node bonding lines have been applied, the improved method comprising the steps of exerting a static load to the stack applied in a direction normal to the planes of the superposed sheets and concurrently applying heat to the edge portions of the metal foils in the stack from sources which generate radiant heat located at opposite side of the stack to cause heat to transfer interiorly of the stack primarily by conduction of heat through the metal foil sheets in the direction of the planes of the sheets in the stack.

References Cited
UNITED STATES PATENTS

| 2,364,597 | 12/1944 | Atwood | 18—17 |
| 3,100,436 | 8/1963 | McNeill et al. | 100—93 |
| 3,295,167 | 11/1967 | Corbin | 18—17 |
| 3,383,737 | 5/1968 | Greger | 18—17 |
| | 10/1961 | Holland | 156—291 |

FOREIGN PATENTS

1/1941 Great Britain.

REUBEN EPSTEIN, Primary Examiner

U.S. Cl. X.R.

156—499, 583; 100—93P; 18—17; 264—319